(12) United States Patent
Haas et al.

(10) Patent No.: US 7,034,676 B2
(45) Date of Patent: Apr. 25, 2006

(54) SECURING METHOD, INTERROGATION UNIT AND SECURING SYSTEM FOR IMPLEMENTING THE SECURING METHOD

(75) Inventors: Heinrich Haas, Meckenbeuren (DE); Udo Knepper, Langenargen (DE); Karlheinz Mueller, Friedrichshafen (DE); Rolf Schuler, Salem (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 615 days.

(21) Appl. No.: 10/258,005

(22) PCT Filed: Apr. 4, 2001

(86) PCT No.: PCT/EP01/03795

§ 371 (c)(1),
(2), (4) Date: Oct. 17, 2002

(87) PCT Pub. No.: WO01/83920

PCT Pub. Date: Nov. 8, 2001

(65) Prior Publication Data

US 2003/0117259 A1    Jun. 26, 2003

(30) Foreign Application Priority Data

Apr. 19, 2000  (DE) ................................ 100 19 277

(51) Int. Cl.
*G08B 1/08* (2006.01)
(52) U.S. Cl. .................. 340/539.1; 340/5.63; 340/5.26
(58) Field of Classification Search ............. 340/539.1, 340/5.63, 10.1, 5.61, 10.2, 5.26
See application file for complete search history.

(56) References Cited

U.S. PATENT DOCUMENTS

| 5,541,585 | A  | * | 7/1996  | Duhame et al. | 340/5.62 |
| 6,169,492 | B1 | * | 1/2001  | Dabbish | 340/5.2 |
| 6,208,239 | B1 |   | 3/2001  | Muller et al. | |
| 6,483,425 | B1 | * | 11/2002 | Avenel | 340/5.61 |
| 6,731,196 | B1 | * | 5/2004  | Ruediger | 340/5.61 |
| 6,803,851 | B1 | * | 10/2004 | Kramer et al. | 340/5.61 |
| 2003/0001723 | A1 | * | 1/2003 | Masudaya | 340/5.61 |

FOREIGN PATENT DOCUMENTS

DE  4020445  1/1992

(Continued)

*Primary Examiner*—Thomas J. Mullen, Jr.
*Assistant Examiner*—Travis Hunnings
(74) *Attorney, Agent, or Firm*—W. F. Fasse; W. G. Fasse

(57) ABSTRACT

In a method for securing an object against unauthorized use, an interrogation unit (1) transmits an interrogation signal (s) and tests whether a response unit (2), which is to be carried by an authorized user, responds to the interrogation signal with a response signal (r) that contains as information a code authorized for desecuring a security device (3). If so, the security device is desecured. The securing method shall prevent unauthorized persons from establishing a radio link via relay stations between the interrogation unit (1) and the response unit (2) for providing the authorized code via this radio link without being noticed by the authorized user. The securing method prevents the desecuring of the security device (3) if the signal transit time of a signal transmitted as the interrogation signal (s) and received as the response signal (r) by the interrogation unit (1) during a monitoring time interval (t4–t5) is greater than a prescribed value. The method is carried out in a keyless security system for securing motor vehicles against unauthorized use.

11 Claims, 1 Drawing Sheet

FOREIGN PATENT DOCUMENTS

| | | |
|---|---|---|
| EP | 0787875 | 8/1997 |
| EP | 0992408 | 4/2000 |
| WO | WO 00/12846 | 3/2000 |
| WO | WO 00/12848 | 3/2000 |

* cited by examiner

SECURING METHOD, INTERROGATION UNIT AND SECURING SYSTEM FOR IMPLEMENTING THE SECURING METHOD

FIELD OF THE INVENTION

The invention relates to a securing method for securing an object against unauthorized use. It further relates to an interrogation unit for carrying out the securing method and a securing system (security system) in which the securing method is used.

BACKGROUND INFORMATION

From the EP 0,787,875 A2 there is known a keyless securing (or security) system for a locking system of a motor vehicle, that comprises an interrogation unit which is allocated to the motor vehicle and which acts on the locking system, and several mobile response units that are to be carried by and on users, whereby the interrogation unit transmits an interrogation signal and tests whether at least one of the response units responds to the interrogation signal with a response signal that contains, as information, a code that is authorized for deactivating or unlocking the locking system. If this is the case, the locking system is deactivated or unlocked by the security system.

The essential disadvantage of this security system is seen in that unauthorized users can gain access to the vehicle via a relay intervention without being noticed by the rightful user, in that they establish a radio link via relay stations between the interrogation unit and the response unit of the authorized user, and deliver the code that is authorized for the unlocking or deactivating to the interrogation unit via this radio link.

SUMMARY OF THE INVENTION

It is thus the underlying object of the invention, to provide a securing method of the above discussed general type, that comprises a high security relative to interventions by unauthorized users.

Underlying the invention is the recognition, that a signal, which is transmitted from the interrogation unit as an interrogation signal and received by the interrogation unit as a response signal, comprises a certain signal running time or transit time, which, in the normal case, corresponds to the sum of the signal transit times in the interrogation unit, in the response unit and the signal transit time that is dependent on the spacing distance on the transmission path or link between the interrogation unit and the response unit, and which, in the case of a transmission via relay stations, is increased by an additional amount, which corresponds to the sum of the signal transit times in the relay stations and the signal transit time on the transmission path or link between the relay stations, wherein the supplemental amount provided by the relay stations to the total signal transit time is considerable and therefore is recognizable in a simple manner.

According to the invention, the object is achieved in that, during a monitoring time interval, it is tested whether the signal transit time of the signal that is transmitted as the interrogation signal from the interrogation unit and that is transmitted back as the response signal from the response unit, that is to say the signal transit time on the transmission path or link from the interrogation unit via the response unit and back to the interrogation unit, is greater than a prescribed value. If the signal transit time is greater than the prescribed value, then this is an indicator, that the response unit is located outside of an acceptable range or distance away from the interrogation unit, and unauthorized persons are attempting to establish a connection between the interrogation unit and the response unit via relay stations, in order to deactivate or desecure a security device that is to be secured through the securing method. Thus, no use authorization will be allocated to the response signal, and therefore the security device will not be released for the deactivation or desecuring.

Preferably, the interrogation signal contains a first data bit sequence as information, and the response signal contains a second data bit sequence as information, whereby the data bits of the data bit sequences are transmitted in bit cells of equivalent size or length, and the first data bit sequence comprises so many data bits, so that data bits of the first data bit sequence are still being transmitted during the reception of the second data bit sequence. Preferably, the monitoring time interval is selected in such a manner, so that the interrogation unit is both transmitting data bits as well as receiving data bits during this time interval.

The signal transit time is preferably determined within the monitoring time interval as the time spacing between a bit cell of the first data bit sequence transmitted by the interrogation unit and a bit cell of the second data bit sequence that is received before the transmission of the next bit cell.

In an advantageous further development of the invention, the first data bit sequence is generated in such a manner that it comprises an interrogation code with a subsequent filler code, whereby the filler code is transmitted during the monitoring time interval and is advantageously generated as a pseudo-random code.

Preferably, the response unit generates a response code from the interrogation code, which response code is encoded in the response unit in a bit-wise manner with simultaneously received bits of the filler code, and is transmitted as the second data bit sequence to the interrogation unit. Then, for again obtaining or recovering the response code, in the interrogation unit, the second data bit sequence is decoded bit-wise with the simultaneously transmitted bits of the filler code. If the result of the decoding is equal to an authorization code provided in the interrogation unit, and if the determined signal transit time is smaller than the prescribed value, then a use authorization is allocated to the response signal, that is to say the user of the response unit is identified as authorized for the use, and the security device is deactivated or desecured, or released for the deactivating or desecuring.

The interrogation unit preferably comprises a transmit/receive unit operated in the full duplex process for transmitting the interrogation signal and simultaneously receiving the response signal, as well as an evaluating device acting on the security device for evaluating the received response signal and deactivating or desecuring the security device dependent on the response signal. The evaluating device comprises transit time evaluating means, which determine the signal transit time of the signal transmitted as the interrogation signal and received as the response signal, and which prevent a deactivating or desecuring of the security device if the determined signal transit time is greater than the prescribed value.

With such an interrogation unit and at least one mobile response unit that cooperates with this interrogation unit and that is to be carried by and on the authorized user, a keyless security system can be realized, with which objects, preferably motor vehicles, are securable against unauthorized use.

BRIEF DESCRIPTION OF THE DRAWINGS

In the following, the invention will be described in more detail in connection with example embodiments and figures, whereby.

DETAILED DESCRIPTION OF A PREFERRED EXAMPLE EMBODIMENT OF THE INVENTION

Figure 1:
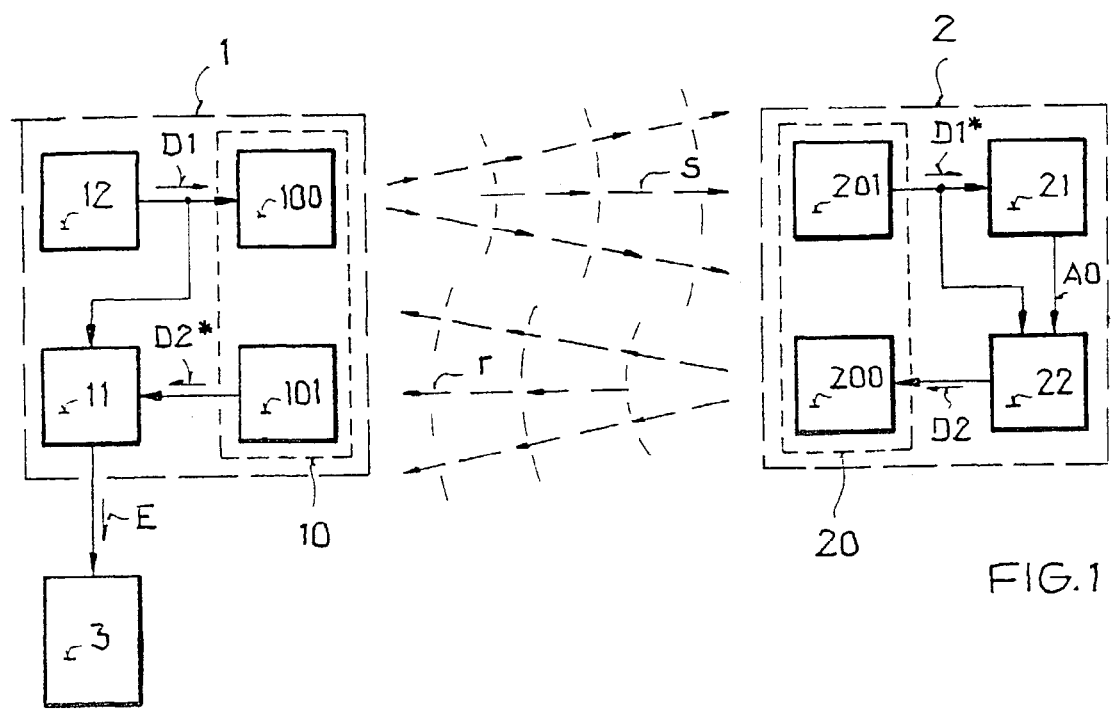
FIG. 1 shows a keyless security system for securing an object against unauthorized use.

According to FIG. 1, the security system with which an object, for example a motor vehicle, is to be secured against unauthorized use, comprises an interrogation unit 1 that is allocated to the object to be secured, and is provided thereon at a location that is not accessible from the outside, and a response unit 2 that is allocated to a use-authorized user, who is to carry the response unit on his person, when he wishes to gain access to the object that is to be secured. The security system may, however, also comprise several response units 2, which are allocated to the same or different users.

The interrogation unit 1 comprises a transmit-receive unit 10 with a transmitting part 100 and a receiving part 101, as well as a signal generator 12 and an evaluating device 11. The response unit 2 comprises a transmit-receive unit 20 with a receiving part 201 adapted to the transmitting part 100 of the interrogation unit 1, and a transmitting part 200 adapted to the receiving part 101 of the interrogation unit 1, as well as an enciphering device 21 and an encoder 22. For the voltage supply, it further comprises one or more batteries; a voltage supply is also conceivable, however, whereby energy is transmitted through an inductive coupling from the interrogation unit 1 to the response unit 2.

The interrogation unit 1 and the response unit 2 communicate with one another over a wireless transmission path or link, for example a radio transmission path or link, whereby the transmission is achieved in the full duplex process, that is to say a simultaneous signal transmission is possible over a forward transmission channel from the interrogation unit 1 to the response unit 2 and over a return transmission channel from the response unit 2 to the interrogation unit 1. In the present example embodiment, the forward transmission channel is, for example, carried out as a 125 kHz channel, and the return transmission channel is, for example, carried out as a high frequency 433 MHz channel, whereby the range of the forward transmission channel, that is to say of the interrogation unit 1, advantageously amounts to a maximum of 3 m. As an alternative to the radio transmission, the signal transmission over the forward transmission channel can also be carried out in an inductive manner via an inductive coupling between the interrogation unit 1 and the response unit 2. This is especially advantageous when the response unit 2 is operated without batteries, because then the energy necessary for the voltage supply will also simultaneously be transmitted through the signal transmission from the interrogation unit 1 to the response unit 2.

With the signal generator 12, the interrogation unit 1 generates a first data bit sequence D1, which contains respectively one data bit in successive bit cells of equal size or length. The first data bit sequence D1 is delivered to the evaluating device 11 and the transmitting part 100 of the interrogation unit 1, is transmitted as the interrogation signal s via the transmitting part 100 to the receiving part 201 of the response unit 2, and is delivered via the receiving part 201 to the enciphering device 21 and the encoder 22 as a received first data bit sequence D1*. From the received first data bit sequence D1*, the enciphering device 21 and the encoder 22 generate a second data bit sequence D2, which is delivered to the transmitting part 200 of the response unit 2, transmitted as the response signal r via the transmitting part 200 to the receiving part 101 of the interrogation unit 1, and delivered as the received second data bit sequence D2* via the receiving part 101 to the evaluating device 11 for evaluation. Thereby, the data bits of the data bit sequences D1, D1*, D2, D2* are contained in bit cells of equal size, that is to say the data bit sequences D1, D1*, D2, D2* are transmitted altogether serially with the same bit timing or clocking, for example with a bit timing or clocking of two kbit/s, whereby one bit timing or clocking period corresponds to the width of one bit cell. Dependent on the information content of the first data bit sequence D1 and the received second data bit sequence D2*, the evaluating device 11 generates a signal E for deactivating or desecuring a security device 3, which is, for example, embodied as a locking system and/or immobilizing apparatus of a motor vehicle.

Figure 2:
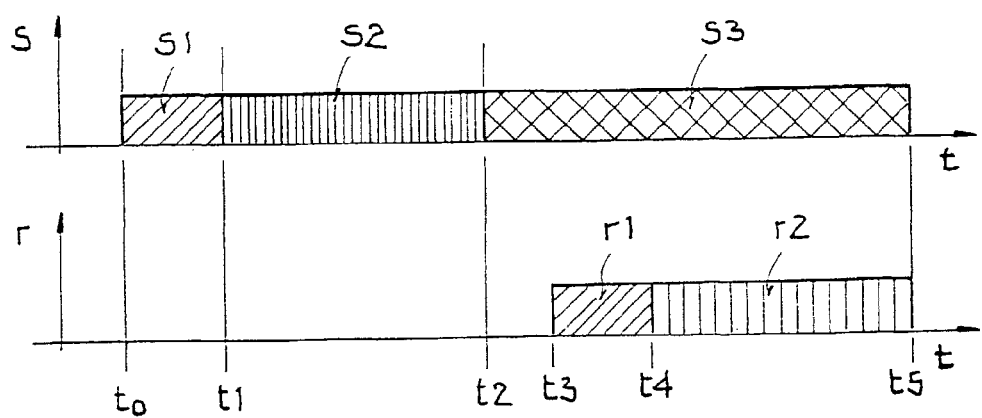
FIG. 2 shows a transmission protocol for the transmission of data between an interrogation unit and a response unit of the security system of FIG. 1.

The signal transmission between the interrogation unit 1 and the response unit 2 is carried out according to a certain transmission protocol. Thereby, the interrogation signal s is transmitted at regular spacings or intervals. According to FIG. 2, the interrogation signal s is composed of three parts s1, s2, s3, namely of a first part s1 transmitted as of the time point t0 for activating the response unit 2, a second part s2 transmitted as of the time point t1, which corresponds to an interrogation code, and a third part s3 transmitted as of the time point t2, which corresponds to a filler code. Thereby, the interrogation code s2 and the filler code s3 together form the first data bit sequence D1, and whereby the interrogation code S2 is a code with a fixed prescribed bit length, for example a 64 bit code, and a filler code S3 is a pseudorandom code. The response signal r is composed of a first part r1 transmitted at the time point t3, and a second part r2 transmitted at the time point t4. Thereby, the first part r1 represents a synchronization part for synchronizing the receiving part 101 to the bit timing of the second data bit sequence D2, and the second part r2 corresponds to the second data bit sequence D2, which is, for example, a 64 bit code.

The enciphering device 21 needs the time interval t2 until t3 in order to calculate a response code AO from the interrogation code. Thereby, the calculation of the response code AO is achieved according to a certain algorithm, which is used on or applied to the interrogation code and an identification key that is unambiguously allocated to the response unit 2. At the time point t4, the receiving part 101 of the interrogation unit 1 is ready to take over the data bits of the second data bit sequence D2 transmitted back as the response signal r, and the bit-wise transmitting of the second data bit sequence D2 begins. At time point t5, the signal transmission is ended with the transmission of the last data bit of the second data bit sequence D2, and as of this time point t5, no further bits of the filler code will be transmitted.

Furthermore, until the time point t4, the bit timings or clockings of the first and second data bit sequences D1, D2 are synchronized to one another, so that a phase error of 0° exists between the bit cells that are next subsequently received and transmitted by the interrogation unit 2. As of the time point t4, the second data bit sequence d2 is bit-wise generated and transmitted. For this, the response code AO is encoded bit-wise and synchronously with simultaneously received bits of the filler code in the encoder 22, for example through an EXOR logic combination, and each bit obtained in this manner is immediately delivered as a data bit of the second data bit sequence D2 to the transmitting part 200 to be transmitted. In this manner it is ensured, that the second data bit sequence D2 is transmitted coherently relative to the received first data bit sequence D1*, that is to say as of the time point t4, a cohesive or connected data stream is transmitted and received by the interrogation unit 1. Each bit cell of the received second data bit sequence D2* is thus allocated to a bit cell of the first data bit sequence D1, whereby the bit information of each bit cell of the received second data bit sequence D2* is co-determined from the bit information of the respective allocated bit cell of the first data bit sequence D1, and wherein the time spacing between the bit cells of the received second data bit sequence D2* and the bit cells of the first data bit sequence D1 respectively allocated thereto is equivalent.

The evaluating device 11 comprises a decoder with which the received second data bit sequence D2* is decoded in a bit-wise manner with simultaneously transmitted bits of the filler code, and it comprises evaluating means, with which a test is carried out whether the result of the decoding corresponds with an authorization code. In this context, the authorization code is a code that is generated from the interrogation code in the evaluating device 11, and that corresponds to the response code AO generated is in the response unit 2, if the security device 3 is to be deactivated or desecured by the interrogation unit 1 in an authorized manner, that is to say, the authorization code corresponds to the response code that is "expected" as a response to the interrogation code. If the result of the decoding corresponds with the authorization code, then this means that the user of the response unit 2 is authorized to use the object to be secured, and that the signal transit time of the signal transmitted as the interrogation signal s and received as the response signal r is smaller than a bit timing or clocking period, because the respective bits of the response code AO and of the received second data bit sequence D2* that correspond with one another were respectively coded or decoded in the same time windows. The test whether the result of the decoding is equal to the authorization code, is thus simultaneously also a test whether the signal transit time is smaller than a bit timing or clocking period. If, on the other hand, the result of the decoding deviates from the authorization code, this means that the user is not authorized to use the object to be secured, or that the signal transit time is greater than a bit timing or clocking period, which is an indication that unauthorized persons are attempting to lengthen the transmission link between the interrogation unit 1 and the response unit 2 through relay stations, which bring about a considerable signal transit time increase. In those cases, in which the result of the decoding deviates from the authorization code, a deactivation or desecuring of the security device 3 is therefore prevented.

With large bit timing or clocking periods, the signal transit time can be smaller than a bit timing or clocking period even for a signal transmission via relay stations. In these cases, the security system is not in a position to recognize whether the signal transmission is carried out via relay stations solely through a comparison of the result of the decoding with the authorization code. In order to identify also these cases, the evaluating device 11 comprises transit time detection means, with which, during a monitoring time interval defined by the time points t4 and t5, the time spacing between a bit cell transmitted by the interrogation unit 1 and a bit cell received by the interrogation unit 1 directly after beginning the transmitting of the above mentioned bit cell is determined as the signal transit time, and with which it is tested whether this determined signal transit time is smaller than a prescribed value. In this context, the prescribed value corresponds to the signal transit time that one obtains in the normal case, that is to say with a direct signal transmission without intervening relay stations, plus an uncertainty factor. If the determined signal transit time is larger than the prescribed value, then this is an indication that the signal transmission between the interrogation unit 1 and the response unit 2 is being achieved no longer directly, but rather via relay stations, and that unauthorized persons are thereby attempting to obtain access to the object to be secured.

The security system identifies a user as a rightful authorized user, if the determined signal transit time is smaller than the prescribed value and the result of the decoding of the second data bit sequence D2* received by the interrogation unit 1 corresponds with the authorization code expected as the response code. Only then will the security device 3 be desecured or deactivated, or released for the deactivation, by the signal E provided to the security device 3.

The invention claimed is:

1. A securing method for securing an object against unauthorized use, comprising:
    transmitting an interrogation signal (s) by an interrogation unit (1) allocated to the object,
    by a response unit (2) allocated to a user, responding to the interrogation signal (s) by transmitting a response signal (r),
    testing whether the response signal contains as information an authorization code authorized for desecuring a security device (3), and
    evaluating a signal transit time of the interrogation signal transmitted by the interrogation unit and the response signal transmitted by the response unit and received by the interrogation unit during a monitoring time interval (t4–t5), and preventing a desecuring of the security device (3) if the signal transit time is greater than a prescribed value,
    wherein
    the interrogation signal (s) contains a first data bit sequence (D1) as information and the response signal contains a second data bit sequence (D2) as information, wherein data bits of the first and second data bit sequences (D1, D2) are transmitted in bit cells of equal size, and the interrogation unit (1) simultaneously transmits data bits of the first data bit sequence (D1) and receives data bits of the second data bit sequence (D2) in the monitoring time interval (t4–t5),
    the first data bit sequence (D1) is composed of an interrogation code and a filler code adjoining the interrogation code, and
    the response unit, for generating the second data bit sequence (D2), generates a response code (AO) from the interrogation code, wherein the response code is encoded bitwise with simultaneously received bits of the filler code and transmitted.

2. The securing method according to claim 1, wherein a time spacing between a bit cell of the first data bit sequence (D1) transmitted by the interrogation unit (1) and a bit cell of the second data bit sequence (D2*) received by the interrogation unit is determined as the signal transit time.

3. The securing method according to claim 1, further comprising decoding the second data bit sequence (D2*) in the interrogation unit in a bitwise manner with simultaneously transmitted bits of the filler code, and preventing the desecuring of the security device (3) if a result of the decoding deviates from the authorization code.

4. The securing method according to claim 1, wherein the filler code is generated as a pseudo-random code.

5. The securing method according to claim 1, wherein the transmitting of the interrogation signal and the response signal between the interrogation unit (1) and the response unit (2) is carried out in a full duplex process.

6. An interrogation unit (1) for carrying out the securing method according to claim 1, comprising a transmit-receive unit (10) for transmitting the interrogation signal (s) and receiving the response signal (r) that is transmitted back by the response unit (2) in response to the interrogation signal (s) during the transmitting of the interrogation signal (s), and an evaluating device (11) for evaluating the response signal (r) and desecuring the security device (3), wherein the evaluating device (11) comprises transit time evaluating means for evaluating the signal transit time and preventing the desecuring of the security device (3) if the signal transit time is greater than the prescribed value.

7. The interrogation unit according to claim 6, wherein the evaluating device further comprises a decoder for decoding the second data bit sequence (D2*) in the interrogation unit in a bitwise manner with simultaneously transmitted bits of the filler code, and preventing the desecuring of the security device (3) if a result of the decoding deviates from the authorization code.

8. A security system for securing an object against unauthorized use, comprising the interrogation unit (1) according to claim 6 allocated to the object, and the response unit (2) that is mobile and that is allocated to the user and that cooperates with the interrogation unit (1).

9. The security system according to claim 8, wherein the response unit (2) includes a battery for a voltage supply.

10. The security system according to claim 8, wherein the response unit (2) is a battery-less operated transponder, to which energy for a voltage supply is provided inductively through the interrogation signal (s).

11. A method using the security system according to claim 8 for securing a motor vehicle against unauthorized use.

* * * * *